US009699103B2

(12) United States Patent
Tzhori et al.

(10) Patent No.: US 9,699,103 B2
(45) Date of Patent: Jul. 4, 2017

(54) METHOD AND SYSTEM FOR FLOW CONTROLLING

(75) Inventors: Meiron Tzhori, Kadima (IL); Jenia Gorokhovsky, Netanya (IL); Arik Litichevsky, Yadin Modi'in (IL)

(73) Assignee: Flash Networks, Ltd, Herzilya (IL)

( * ) Notice: Subject to any disclaimer, the term of this patent is extended or adjusted under 35 U.S.C. 154(b) by 233 days.

(21) Appl. No.: 13/603,465

(22) Filed: Sep. 5, 2012

(65) Prior Publication Data

US 2014/0068008 A1 Mar. 6, 2014

(51) Int. Cl.
G06F 15/16 (2006.01)
H04L 12/801 (2013.01)
H04L 12/825 (2013.01)

(52) U.S. Cl.
CPC ............. *H04L 47/37* (2013.01); *H04L 47/25* (2013.01); *H04L 47/29* (2013.01)

(58) Field of Classification Search
None
See application file for complete search history.

(56) References Cited

U.S. PATENT DOCUMENTS

| 6,081,843 | A * | 6/2000 | Kilkki | H04Q 11/0478 709/232 |
| 6,845,398 | B1 * | 1/2005 | Galensky | G06Q 20/32 709/203 |
| 7,949,775 | B2 * | 5/2011 | Virdi et al. | 709/231 |
| 2003/0105874 | A1 * | 6/2003 | Schuster et al. | 709/231 |
| 2006/0140591 | A1 * | 6/2006 | Estevez et al. | 386/105 |
| 2006/0215596 | A1 * | 9/2006 | Krishnaswamy et al. | 370/328 |
| 2007/0192812 | A1 * | 8/2007 | Pickens | H04L 1/004 725/94 |
| 2008/0256272 | A1 * | 10/2008 | Kampmann et al. | 710/57 |
| 2011/0029596 | A1 * | 2/2011 | Spatscheck et al. | 709/203 |
| 2011/0138427 | A1 * | 6/2011 | Shen et al. | 725/62 |
| 2011/0191773 | A1 * | 8/2011 | Pavel | G06Q 50/06 718/100 |
| 2011/0225317 | A1 * | 9/2011 | Balachandran et al. | 709/232 |
| 2012/0120254 | A1 * | 5/2012 | Tan et al. | 348/184 |
| 2012/0311171 | A1 * | 12/2012 | Holley et al. | 709/231 |
| 2013/0028088 | A1 * | 1/2013 | Do | H04L 1/0002 370/235 |
| 2013/0044801 | A1 * | 2/2013 | Cote et al. | 375/240.01 |

\* cited by examiner

*Primary Examiner* — Joshua Joo
(74) *Attorney, Agent, or Firm* — Smith Tempel Blaha LLC; Gregory Scott Smith

(57) ABSTRACT

Content delivery to end user devices (EUD) is controlled by transmitting content portions at a controlled flow. The time for the EUD to process the data is used to control the flow. The first portion is transmitted to the EUD and the amount of time to process the first portion is noted. Threshold values to stop and start transmissions are examined prior to the transmission of each content portion. If the amount of data remaining to be processed by the EUD is below the stop transmission threshold, transmission continues with the next portion. If the amount of data remaining to be processed by the EUD is above the stop threshold, transmission is either stopped or retarded. When it is determined that the amount of data remaining to be processed by the EUD is above the start transmission threshold, transmission is started or continued.

18 Claims, 4 Drawing Sheets

METHOD AND SYSTEM FOR FLOW CONTROLLING

CROSS-REFERENCE TO RELATED APPLICATIONS

This is a utility patent application being filed in the United States Patent Office as a non-provisional application for patent under Title 35 U.S.C. §100 et seq. and 37 C.F.R. §1.53(b) and, claiming the benefit of the prior filing date under Title 35, U.S.C. §119(e) of the United States provisional application for patent that was filed on Sep. 5, 2011 and assigned Ser. No. 61/531,037 which application is incorporated herein by reference in its entirety.

BACKGROUND

The present invention relates to the field of network traffic management, and more particularly to improving the quality of the service provided by wired and wireless networks by reducing traffic volume and improving network utilization.

Today, more and more users, systems and applications, search and browse through the Internet, accessing a variety of different web sites that offer access to, and the delivery of different media files. This searching and browsing process is generally referred to as "surfing" and the entities performing the surfing are generally referred to as "surfers". A few non-limiting examples of files accessible through surfing include media files, such as ADOBE FLASH files, MICROSOFT SILVERLIGHT files, software files, documents, file sharing applications, etc. The files that are available for access and/or download can be embedded within web pages or they can be standalone files. A few examples of popular web sites that provide a wide variety of files for access, streaming, downloading, etc., include YOUTUBE, GOOGLE and YAHOO, Windows-Update, Internet stores such as "App Store" the electronic shop of Apple Inc. USA, and many other web sites are also available for gaining access to such files. Throughout the disclosure, downloading of a media file can be used as an example of downloading a large file. A large file can be a file that requires more than few minutes to download, such as 1-10 minutes for example. In some cases, in order to accelerate downloading of a large file, the downloading process can be executed over two or more connections.

Some video files use container-file-format for delivering video file over a Hyper Text Transfer Protocol (HTTP) based network. Usually a surfer can use a video player to observe a video file. An example of one such player is the FLASH PLAYER from Adobe Systems Incorporated. The player may be an application that can be invoked by the surfer's browser application, an embedded feature of a browser, a stand-alone application and even a stand-alone device. A few examples of such video Players that are commonly used include the ADOBE FLASH Player and the MICROSOFT SILVERLIGHT player, however, many other players are also available for use.

Within this description and the below-recited claims, the terms "ADOBE FLASH file", "MICROSOFT SILVERLIGHT file", "video file", any other type of file and "media file" can be used interchangeably and the term "media file" can be used as a representative term for the different types of files.

For a variety of reasons, including the complexity of the technology and the level of clarity and resolution provided, a typical video file can be rather large in size. Consequently, downloading of a typical video file can consume a significant amount of bandwidth and require a considerable amount of time. Although when first introduced, such video files were typically only available for downloading to computers connected via hardwired connections to the Internet, technology has advanced to the point where such video files are available for download over wireless networks to mobile devices. For instance, mobile devices such as, but not limited to, notebook computers, cellular telephones or handsets, handheld computers, Personal Data Assistants (PDA), or other computing device with wireless communication capabilities are able to access, download and view high-definition video content. Although technology advancements have greatly improved the bandwidth available to mobile devices thereby improving the download speed of data, the download time for mobile devices is still somewhat bandwidth limited compared to hardwired access to the Internet and as such, mobile devices can experience considerable delays when downloading video files.

In many cases, the user may stop viewing and/or listening to the media file before the file has finished downloading. In such cases, the transmitting portion of the video not watched by the user would consume network resources without any actual benefit to the user.

In most wireless networks, the capacity is provisioned so as to provide a balance between adequate utilization in times when consumption is low, and providing adequate user experience in times when congestion is high. In such situations, it can be beneficial to lower the bandwidth available to users downloading non-media files in order to spread the download duration and reduce the peak consumption of bandwidth due to the data downloads.

An access network operator (ANO) is the typical entity or device within a network that operates to provide provision and manage the infrastructure that provides access to the Internet for subscribers. Examples of an ANO can be a telecom operator, such as but not limited to: a cellular operator, a satellite communication service provider, a Public Switched Telephone Network (PSTN) operator, Internet Service Provider (ISP) premises, etc. Thus, the main commodity that an ANO delivers is bandwidth, and as such, the ANOs seek and employ the use of different methods for handling the downloading of media files to improve the utilization of their bandwidth resources. Some of the methods employed include a buffer limiter, which limits the amount of data (i.e., the number of bytes) that can be downloaded by an entity until the entity observes previously downloaded data.

For non-media files, the buffer limiter can limit the rate of the transfer of a file to a constant rate (for example, to a constant rate 250 Kbits per second). The rate can be predetermined for all users or determined in accordance with a policy. Existing rate limiting solutions work by limiting the rate of packets sent so that the rate would be constant over the entire period.

BRIEF SUMMARY

The present disclosure generally relates to the field of data communication over a packet switched network, and more particularly, to a solution that enables the downloading of a large file to an entity that is accessing or requesting such a large file. We found that in existing Buffer limiting solutions or rate limiting solutions the download rate is adjusted according to a required rate, for example the rate of the video. This method of operation causes the peak rate of the transmission to be significantly lower than that of the unlimited transmission which causes many cellular networks to be inefficient in transmitting the data because they are tuned for traffic patterns that have high peak rates.

Exemplary embodiments, as presented herein, solve the above-described needs in the art by providing a flow-controlling method and system that creates traffic patterns having periods of high congestion (peak rate of transmitting) followed by periods having low bandwidth consumption or even bandwidth consumption. Examples of the disclosed embodiments convert a flat transmitting mode into a burst transmitting mode, in which packets are aggregated and transmitted in bursts. Thus allowing the wireless network to properly utilize the available resources.

In general, the various embodiments operate by transmitting at the maximum rate for periods of time, followed by transmission at a very low rate or stopping the transmission altogether, such that the amortized transmission rate or buffer rate would still meet the requirements for the delivery of the content. The timing and duration of the period of time during which the maximum rate is used depends on the processing time of the data stored in the buffer of the surfer equipment. The processing time can be calculated based on the amount of data that has already been downloaded, taking into consideration the timing of when the downloaded was initiated and the processing time that is needed by the requesting application.

For example, when the requesting application is a media player, such as a video player, then the play time of the downloaded video can be calculated based on the frame rate used for that file. Accordingly, the number of bytes or packets can be calculated per each burst of packets as well as the time interval between the bursts of packets. In cases in which the downloaded file is a large application, or a software file, for example, the number of bytes (packets) in a burst of packets and the time interval between bursts can be dependent on an estimation of the size of a buffer at the end-user device and the processing time of that buffer. Alternatively the size of a burst and the time between bursts can be set to predefined values that can be reconfigured from time to time, keeping in mind that the time between bursts has to be smaller than the value of the Time-Out of the one or more connections that are used to download the file. An end-user device, or a user device can be a mobile device such as, but not limited to, notebook computers, cellular telephones or handsets, handheld computers, Personal Data Assistants (PDA), or other computing devices with wireless communication capabilities that are able to access, download large files and view video content.

Other objects, features, and advantages of the various embodiments will become apparent upon reading the following detailed description of the various embodiments with the accompanying drawings and appended claims.

DETAILED DESCRIPTION OF THE VARIOUS EMBODIMENTS

The present invention is directed towards providing a Flow-Controlling Server (FCS) and method for flow controlling, as well as various aspects, features and advantages that may be incorporated into such embodiments.

Turning now to the figures in which like numerals represent like elements throughout the several views, exemplary embodiments of the FCS are described. For convenience, only some elements of the same group or similar items may be labeled with numerals. The purpose of the drawings is to describe exemplary embodiments and not for production. Therefore features shown in the figures are chosen for convenience and clarity of presentation only.

Although portions of this detailed description are written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task a software program may be loaded to an appropriate processor as needed. In addition, functions or features for the various embodiments are not necessary restricted by module or unit boundaries, and as such in various embodiments, certain functions or features described in one configuration and in certain modules, may be moved around to other configurations and other modules in other embodiments. In the present disclosure the terms task, method, process can be used interchangeably.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
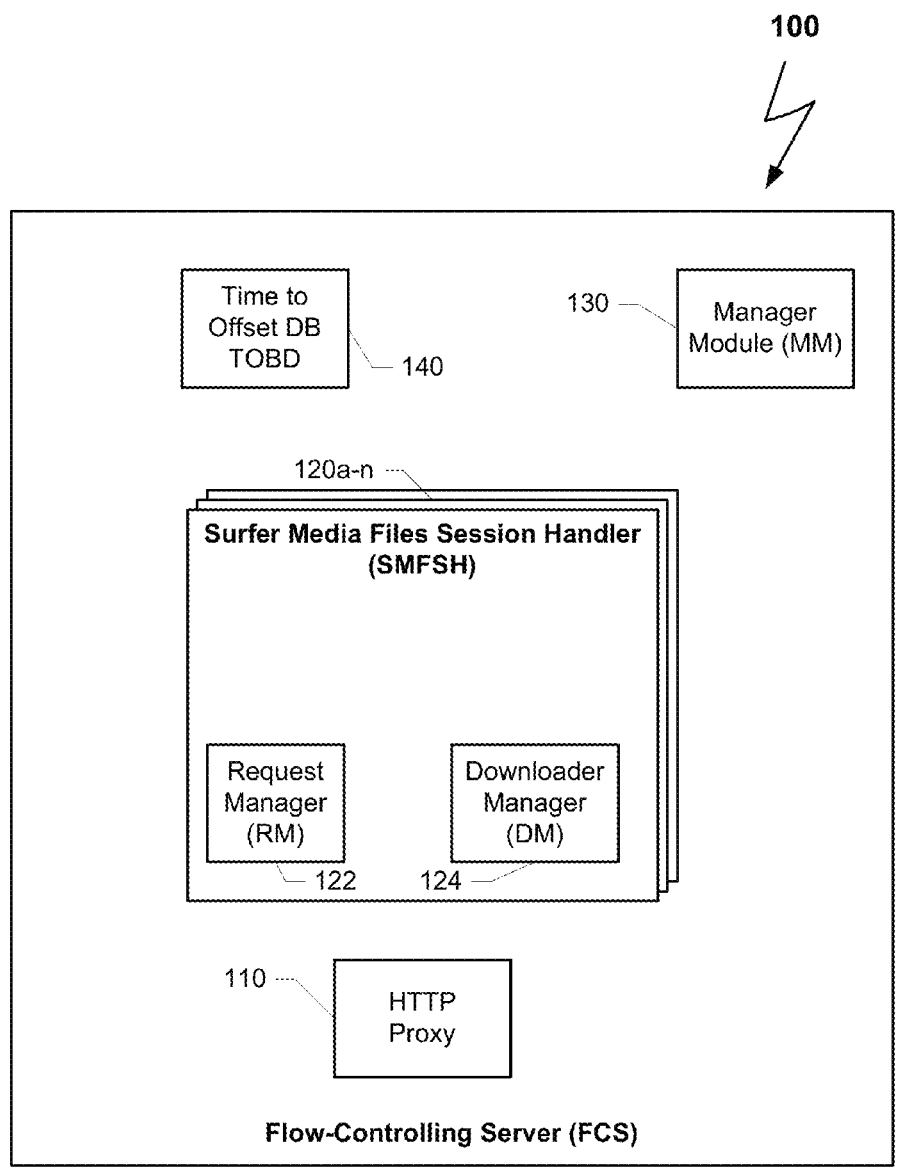
FIG. 1 schematically illustrates a simplified block diagram with relevant elements of an exemplary Flow-Controlling Server (FCS).

FIG. 1 is a block diagram illustrating the relevant components of an exemplary Flow-Controlling Server (FCS) 100. As a non-limiting example, an FCS can be located between a plurality of end-user devices (collectively referred to as surfer equipment) and a plurality of web sites or web servers or content sources, at an access network, for example. The FCS can intercept the data traffic between the plurality of surfer equipment on one side of the access network, and the Internet on the other side of the access network.

As a non-limiting example, some embodiments of an FCS 100 can be implemented by using, among other elements, a database, such as a Time to Offset Database (TODB) 140.

The data stored in a TODB can be dependent on the type of the downloaded file. A non-limiting example of some of the information that may be included in an exemplary TODB for downloading a software file can include the time between bursts of packets and the amount of data to be carried by a burst of packets. The data in a burst can be transmitted at a high bit rate, such as a maximum bit rate for example. In addition or alternatively, the TODB can be utilized for the downloading a video file. In general, the FCS 100 processes files that are being transferred between entities, such as web servers and end-user devices as a non-limiting example, in order to control the shape of the data traffic. These are referred to as flow-controlled files. Thus, the term database, for purposes of the disclosure, may simply refer to raw data stored within a memory element, data stored in the memory element in a predetermined and highly structured manner, data stored on a system that operates to manage and control access to the date, as well as any other variations.

Several tables can be used by the FCS in the provision of the flow controlling service. The tables can assist the FCS in different operations. Operations such as, but not limited to: managing the different databases; saving the state of each downloaded file such as whether the first packet was already sent, whether the file should be flow controlled and other parameters.

Referring now to FIG. 1, the illustrated embodiment of the FCS 100 is shown as including a plurality of Surfer Media Files Session Handler (SMFSH) 120a-n. Each SMFSH handles a current active session, which may include the process of downloading a single media file, multiple files (each file can be carried over one or more connections toward an end-user device), etc. In the illustrated embodiment, each SMFSH 120 can comprise a Download Manager (DM) 124 that will be responsible for controlling the time for releasing of the packets. For example, the DM can control the time between burst and the amount of data in each burst. The SMFSH 120 can include a Request Manager (RM) 122 that will be responsible for identifying sessions, such as HTTP sessions, that will need to be flow controlled by the DM and for filling the TODB 140 with the correct time-to-offset entries as well as other data, for example.

An exemplary embodiment of the FCS 100 can further comprise a Manager Module (MM) 130. At the initialization of the FCS 100, the MM 130 can allocate a plurality of resources that the FCS will require for its operation. The MM 130 can also manage the TODB 140, for example. An exemplary embodiment of the MM 130 can periodically scan the TODB 140 and delete old files that are no longer required (i.e. files which are not frequently requested or have not been requested for a threshold period of time, etc.). The MM 130 can communicate with other servers in the access network operator premises (ANOP) for management information and/or for communication status and control data.

In addition the FCS 100 may comprise an HTTP proxy 110. The HTTP proxy 110 can be adapted to handle the first four layers of the OSI seven layer communication stack. The layers can be the Physical Layer, Data Link Layer, Network Layer, and Transport Layer. Exemplary embodiments of the FCS 100 can be transparent to the surfer equipment, as well as to the web servers. The HTTP proxy 110 can be adapted to collect packets coming from the plurality of surfer equipment or response files from the web sites, and forward them into the internal modules of the FCS 100 or toward their destination. In other embodiments, instead of a proxy, the FCS 100 can be associated with a router for example. Yet in other embodiments, the FCS 100 can be associated with a Peer to Peer server instead of a proxy, for example.

Figure 2:
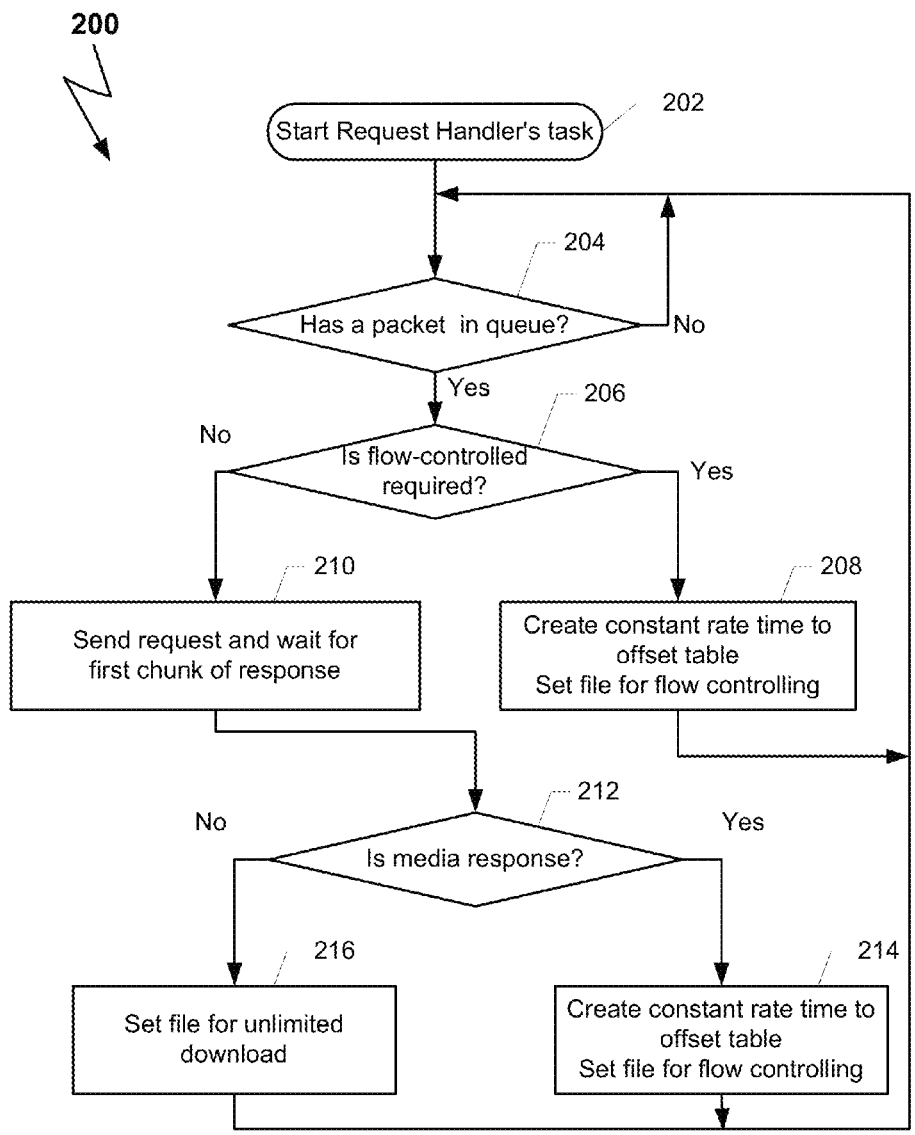
FIG. 2 illustrates a flowchart showing relevant actions of an exemplary request handling process.

FIG. 2 illustrates an exemplary process for handling new requests that may include or invoke the downloading, uploading or transfer of a media file, or a large file for which flow controls are to be applied. The process can be implemented in a variety of manners but for illustrative purposes, will be described as being implemented within an exemplary RM 122 (FIG. 1). The process is initiated 202 upon a session being set up or established with a surfer's equipment or end user device, such as in response to a request being sent by a surfer's equipment, and the process may run in a loop as long as the session is active. A non-limiting example of such a request is a media player, executed on a personal computer, streaming a video file from a content source. Once the process has been initialized, the queue of the RM 122 is examined to determine if there are any packets that have been queued for processing 204. If any packets exist in the queue, then the next packet to be processed is read from the queue or otherwise obtained. If the queue is empty, then the process will continue to loop by examining the queue and waiting for a packet 204.

Once a packet is obtained from the queue, the process then makes a determination as to whether or not flow controlling needs to be invoked 206 for the packet. For instance, if the HTTP headers of the request or the packet indicate that the request will result or invoke a media file download, then the RM 122 will allocate 208 a table for handling the file in the TODB 140 (FIG. 1). At this point processing then returns to examining the queue looking for the next packet 204.

If it is determined that flow controlling is not required for the packet, then the RM 122 will send the request toward its destination 210 and will then wait for the response and attempt to read video metadata from the response 212. Upon receiving the response 212, the response is examined to determine if it is a media data response. If the response is a media data response 212, the RM 122 (FIG. 1) allocates 214 a table for handling the file in the TODB 140 (FIG. 1) and marks the file for flow controlling 214. If the RM 122 determines that the file is not a media data file and was not found to be a download of a file of substantial size that would involve the download of a large number of packets and that could have an impact on the availability of bandwidth, then the RM 122 marks the file as one that does not require flow controlling 216.

Yet in some embodiments, an example of RM 122 (FIG. 1) can compare the file type with a policy list of types of files that are entitled to flow control, and accordingly can handle the file.

Figure 3:
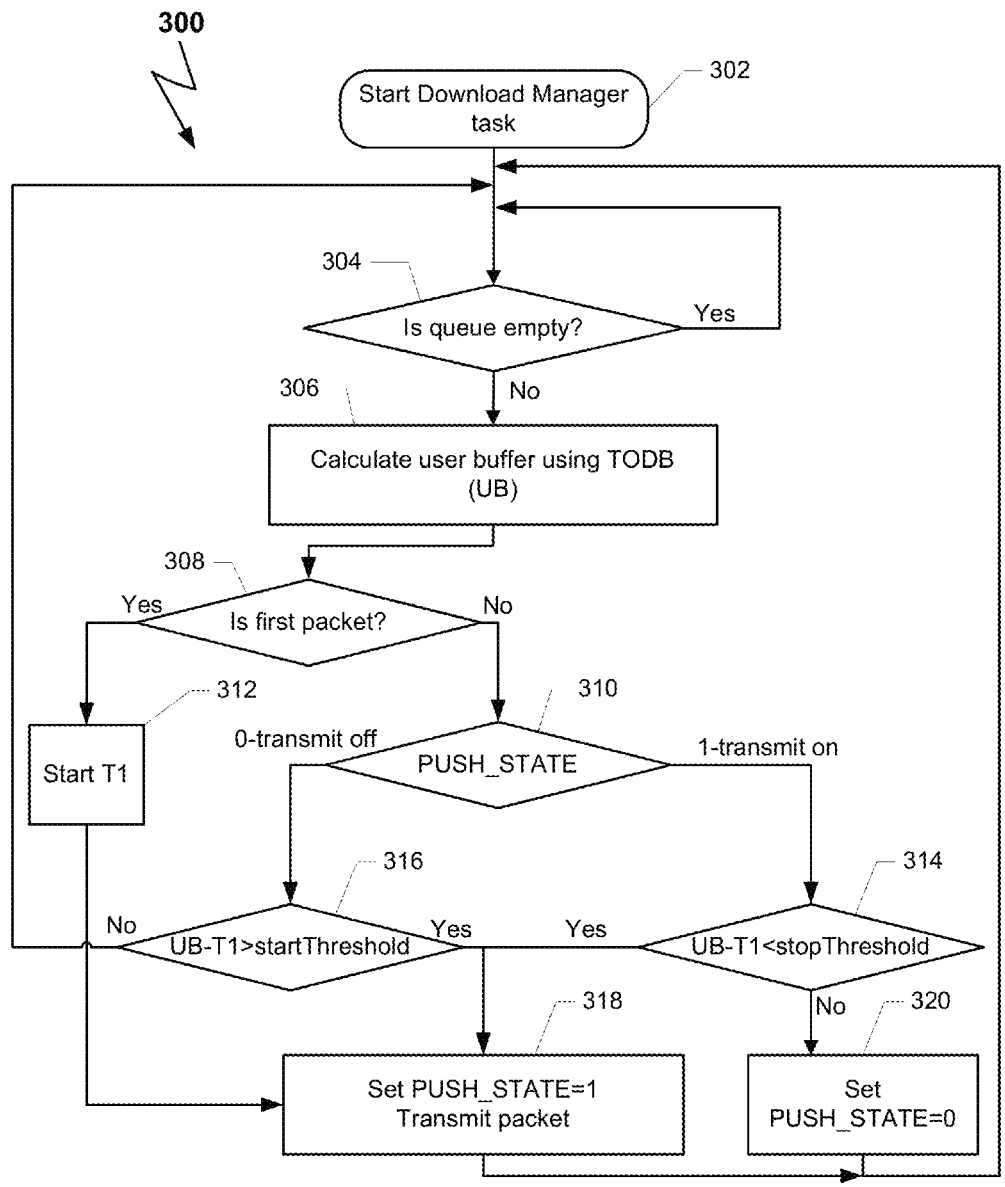
FIG. 3 illustrates a flowchart showing relevant actions of an exemplary downloading process with flow-control.

FIG. 3 is a flowchart diagram illustrating exemplary actions that may be performed by a module implementing an exemplary flow controlling process 300. The exemplary process can be implemented in a variety of manners but for illustrative purposes, will be described as being implemented within an exemplary DM 124 (see FIG. 1). Process 300 can be adapted to the type of file that is to be downloaded. The illustrated process 300 can be used for downloading a media file, for example. In downloading of a media file, the play time of each frame is known and accordingly process 300 can use time units. For files that are not media files, such as software files, the time is less mandatory and the units that can be used for controlling the flow are the number of bytes.

The process executed by the DM 124 is invoked for files that have been marked for flow controlling by the RM 122 (see action 214 FIG. 2). In some embodiments, two configurable values or parameters are utilized during the exemplary flow controlling process by the FCS configuration:

startThreshold and stopThreshold. These values may be initiated or read from memory upon invoking the exemplary process 302 in the DM 124. For media files, the values can be time units. Initially, the process examines a queue to determine if there are any packets available 304. If the queue is empty, the process will continue to loop on the queue until a packet is available 304. Once a packet is detected in the queue, the packet will be examined so that the time to use the user buffer is calculated according to the number of bytes included in the packet 306 for determining the value of UB in time units.

In calculating the buffer size, the TODB is examined to identify, among other things, the number of bytes and the time required for rendering the content 306. If 308 the packet obtained from the queue is the first packet of a media file or media file segment/packet, the DM 124 will start 312 a timer T1 and will initialize 318 a variable, referred to as the PUSH_STATE, to a value to indicate that the DM 124 is in the transmit state (e.g. the value of 1). The first packet is then transmitted, toward its destination, in accordance with the PUSH_STATE 318 and method 300 returns to block 304 looking for a packet in the queue. When encountering subsequent packets, the DM will calculate the size of the buffer the user received by finding the first offset in the TODB table of the file that is lower than the number of bytes that have already been transmitted to the user, finding the next offset in the table, and finding the corresponding times and finding the actual offset by linear interpolation. Thus, the buffer in the end user device or destination (UB) can be defined in time units and it can express the estimate time that the surfer equipment may process the data that has already been downloaded from the beginning of the download.

The timer T1 indicates the time that has lapsed from the beginning of the download. Subtracting the value of T1 from UB (actions 314, 316) results with a time value that reflects to the remaining processing time of the buffer at the surfer equipment.

The DM proceeds according to value of the PUSH_STATE 310. If the PUSH_STATE is equal to 1, the time value of T1 is subtracted from UB and compared to the stopThreshold. The stopThreshold is a value, in time units, selected to indicate that there is content at the destination such that a sufficient time can be played before additional transmission is needed. Then, the download process can be hold for a period of time while the processing or rendering of the received data, at the user device, commences. While holding the download process, additional packets can be aggregated at the queue. If the difference between UB and the timer T1 is less than the stopThreshold 314, the packet is then sent to the user 318 and the PUSH_STATE remains at the value of 1. Processing then continues by examining the queue for the next packet 304. However, if the difference is not less than the stopThreshold (in seconds in this example), the PUSH_STATE is changed to the value of 0 to indicate that no transmissions are presently permitted or required 320. Processing then returns to examining the queue for the next packet 304. In some embodiments, the packet being processed may be transmitted prior to returning to examining the queue and in other embodiments, the packet being processed can be returned to the queue or simply held for later transmission. Further, a delay may be invoked after determining that the stopThreshold has been exceeded, thus allowing time for an amount of data in the user buffer to be rendered and thus making room in the user buffer.

If the PUSH_STATE is determined 310 to be equal to 0, the DM will then subtract the value of the timer T1 from the value of UB and compare it to the startThreshold 316. If the difference between UB and T1 is greater than the startThreshold, the DM will change the PUSH_STATE to a value of 1 and transmit the packets that are stored in the queue 318. However, if the difference between the UB and T1 is not greater than the startThreshold, transmission is still prohibited and processing will return to examining the queue 304 with or without imposing a delay. Consequently, the queue is drained in bursts as function of T1, UB, startThreshold and stopThreshold.

Thus, in operation the various embodiments of the FCS will monitor the amount of time for rendering or processing the data that has been sent to a user device and then, can operate to only feed, in burst mode, additional data to the user device as necessary. This is accomplished by being cognizant of the data, the processing time for rendering the data, and in some embodiments, knowledge of the processing/rendering speed of the user device and the buffer capabilities of the user device. The data for a media file is broken into segments, packets or data chunks and size and rendering time for each segment is known, such as stored within the TODB. Data is then fed to the user device only when it is clear that the user device has sufficient buffer space for handling the data or, the buffer space at the end user device has a limited amount of data remaining to be processed or rendered. Otherwise, the transmission of the data can be delayed to free up bandwidth space for other uses. In addition, embodiments may also incorporate knowledge of the current bandwidth utilization of the communications path to the user device. In such embodiments, if the stopThreshold has been exceeded but, the current bandwidth utilization of the channel is low, the FCS may opt to send data to the user device any way, after ensuring that the user device can handle the next segment. Likewise, if the startThreshold indicates that additional data can be sent to the user device but, the current bandwidth utilization is excessive, the FCS can determine how much data (time wise) remains in the user buffer of the user device and delay the delivery of the next segment in hopes that the bandwidth utilization will have decreased.

Other exemplary embodiments of the FCS may use a different stopThreshold constant for the first transmit period of the file. In yet other embodiments, the stopThreshold and startThreshold can be adjusted based on the user device, the current bandwidth utilization on the communication channel with the user device, the type of content, etc.

In other exemplary embodiments of the FCS, the time to offset table would be updated in real time by a policy system or another system and thus the rate would by dynamically controlled while keeping the benefits of high radio network utilization.

In other exemplary embodiments of the FCS, the FCS may signal to the web server during stop periods so that transmission would halt or transmission be lowered in order to avoid buffering significant amounts of data. This can be accomplished by, for example reducing the size of the TCP receive window or by other means.

It should be appreciated that the particular operations described for the various embodiments of the FCS could be incorporated and be an integral part of a larger transmission system, such as an ISP premises, be housed in a content server, and be implemented at any point along the path between the content source and the end user equipment. In addition, multiple FCS systems could be utilized along a single path to help limit bandwidth utilization along various segments of the transmission path. For instance, if the transmission path includes one segment with higher bandwidth availability and another segment with a lower bandwidth availability, two FCS systems with differing startThreshold and stopThreshold values could be employed.

In the embodiments described, the DM 124 has been described as either being in a transmit state or a no-transmit state. However, it should be appreciated that in other embodiments, the DM 124 may include more than two states. For instance, the DM may include a no-transmit state and multiple transmit states with each state being associated with a different transmission rate, buffer size, etc. In such an embodiment, the DM would be enabled to transmit data at a very high rate, thereby absorbing or utilizing more bandwidth when the bandwidth is available, dropping down to lower transmission rates if the communication becomes congested, and halting transmission if there is not a sufficient amount of bandwidth to reliably transfer the file or if it would results in adverse affects to other parties.

Yet, in some embodiments, in downloading of large files, such as software, for example, size units can be used by method 300 (number of bytes). In that case the UB can reflect the next total of number of bytes that has been transmitted to the user device. The value of the UB can be fetched from the TODB. The value of T1 can reflect the total number of bytes that were transmitted to the user, and the values of startThreshold and stopThreshold can be in number of bytes.

In some embodiments of the FCS 100, an example of SMFSH 120 can be adapted to combine data transmission that belongs to a plurality of applications which are currently used by the user equipment. Data traffic that is currently transmitted to those applications, simultaneously, can be routed toward the same queue of DM 124 to be handled by exemplary process 300 in order to be flow controlled and be transmitted in bursts. In such an embodiment the values of the startThreshold and stopThreshold can be adapted to the application that is more sensitive to time delay. For example when downloading a media file in parallel to software file the startThreshold and stopThreshold can be adapted according to the media file.

Figure 4:
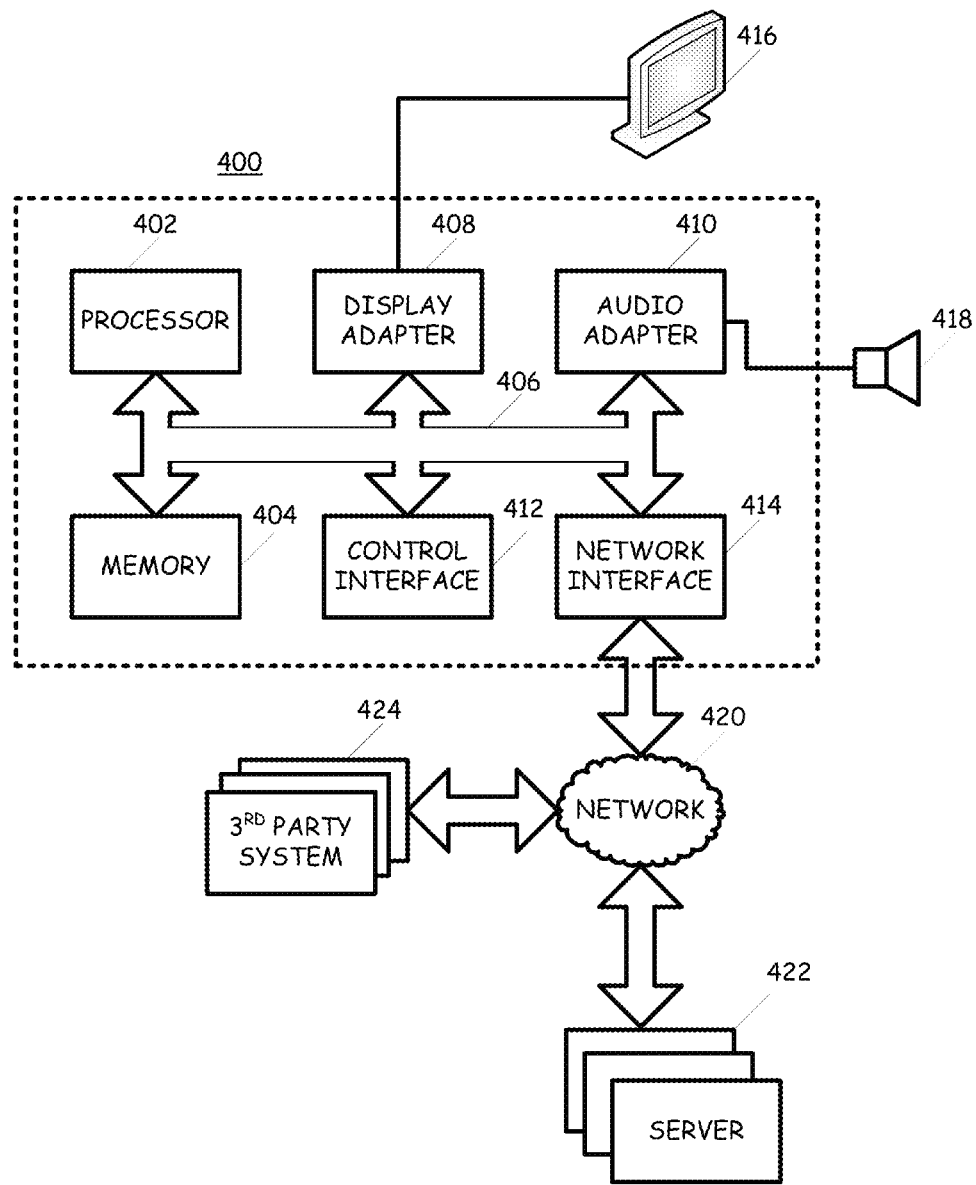
FIG. 4 is a functional block diagram of the components of an exemplary embodiment of a system or sub-system on which embodiments or portions of embodiments of the FCS, as well as user devices may exist.

FIG. 4 is a functional block diagram of the components of an exemplary embodiment of a system or sub-system on which embodiments or portions of embodiments of the FCS, as well as user devices may exist. It will be appreciated that not all of the components illustrated in FIG. 4 are required in all embodiments of the FCS or components of the FCS or user device but, each of the components are presented and described in conjunction with FIG. 4 to provide a complete and overall understanding of the components. The controller can include a general computing platform 400 illustrated as including a processor/memory device 402/404 that may be integrated with each other or, communicatively connected over a bus or similar interface 406. The processor 402 can be a variety of processor types including microprocessors, micro-controllers, programmable arrays, custom IC's etc. and may also include single or multiple processors with or without accelerators or the like. The memory element 404 may include a variety of structures, including but not limited to RAM, ROM, magnetic media, optical media, bubble memory, FLASH memory, EPROM, EEPROM, etc. The processor 402 or other components in the controller may also provide components such as a real-time clock, analog to digital convertors, digital to analog convertors, etc. The processor 402 also interfaces to a variety of elements including a control interface 412, a display adapter 408, an audio adapter 410, and network/device interface 414. The control interface 412 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or, another computer or processing device or the like. The display adapter 408 can be used to drive a variety of alert or display elements 416, such as display devices including an LED display, LCD display, one or more LEDs or other display devices. The audio adapter 410 interfaces to and drives another alert element 418, such as a speaker or speaker system, buzzer, bell, etc. The network/interface 414 may interface to a network 420 which may be any type of network including, but not limited to the Internet, a global network, a wide area network, a local area network, a wired network, a wireless network or any other network type including hybrids. Through the network 420, or even directly, the controller 400 can interface to other devices or computing platforms such as one or more servers 422 and/or third party systems 424. A battery or power source provides power for the controller 400.

Overall, these various embodiments will improve the utilization of the network and the user experience of the end user. The described embodiments operate to reduce the radio network resources required to serve the user.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. Software of a logical module may be embodied on a computer readable medium such as a read/write hard disc, CDROM, Flash memory, ROM, or other memory or storage, etc. In order to execute a certain task a software program may be loaded to an appropriate processor as needed. In the present disclosure the terms task, method, process can be used interchangeably.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A method, employed by a server, for controlling a transfer of data to an end destination over a transmission channel, the method comprising the actions of:
   receiving a request for downloading of a first file;
   in response to receiving the request, obtaining a packet of the first file from a queue and based on the packet, determining that flow control needs to be performed for the first file;
   if flow control is required, determining a constraint that is involved in downloading the first file to the end destination, wherein the constraint depends on the type of the first file;
   commencing transmission of a portion of the first file to the end destination;
   the server autonomously monitoring a current condition of the constraint for the first file;
   receiving a request for downloading of second file;
   in response to receiving the request, obtaining a packet of the second file from a queue and based on the packet, determine that flow control needs to be performed for the second file;
   if flow control is required, determining a constraint that is involved in downloading the second file to the end destination, wherein the constraint depends on the type of the second file;
   commencing transmission of a portion of the data of the second file to the end destination;
   the server autonomously monitoring a current condition of the constraint for the second file;
   if the current condition of the constraint for the first or second file increases above a first threshold value, retard delivering more of the first or second file respectively, and accelerate delivering of the first or second file respectively if the current condition of the constraint for the first or second file declines below a second threshold;
   wherein the first file is a media type file including audio and/or video content and the current condition of the constraint for the first file type includes identifying the amount of the first file downloaded to the end destination and the amount of time that the end destination has had to render the first file and, wherein the second file is a non-media type of file excluding audio and/or video and the current condition of the constraint for the second file type includes identifying the amount of the second file downloaded to the end destination.

2. The method of claim 1, wherein the action of retarding the delivery comprises stopping further transmissions.

3. The method of claim 2, wherein the action of accelerating the delivery comprises resuming the transmission if the transmission was stopped, or continuing the transmission of data if the transmission was not stopped.

4. The method of claim 1, further comprising the action of setting a transmission state to one of at least two states, and the action of accelerating the delivery if the constraint declines below a second threshold is only performed if the transmission state is set to no transmit.

5. The method of claim 1, further comprising the action of setting a transmission state to one of at least two states, and the action of retarding the delivery if the constraint increases above a first threshold is only performed if the transmission state is set to transmit.

6. The method of claim 1, wherein the end destination is a mobile device.

7. The method of claim 1, wherein for the first file, which is a media file type, the constraint represents the play time of each frame of the first file.

8. The method of claim 1, wherein the constraint for the first file and the constraint for the second file depends on the processing of the first file or the second file by the end destination.

9. A method employed by a server, for controlling a transfer of content to an end user device over a transmission channel, the method comprising the actions of:
   detecting a transmission of a media type file that includes audio and/or video destined for the end user device;
   detecting a transmission of a non-media type file, wherein the non-media type file does not include audio and/or video, destined for the end user device;
   for the media type file:
      identifying segments within the media type file and a time required for the end user device to process each segment;
      setting a transmission state to a first value;
      commencing transmission of a first segment to the end user device at a rate based on the transmission state;
      the server autonomously monitoring a time from commencement of the transmission;
      calculating a buffered amount of data existing at the end user device based on the monitored time and an estimated time required to render the already transmitted first segment;
      if the buffered amount of data increases above a first threshold value, setting the transmission state to a second value; and
      commencing transmission of a next segment to the end user device at a rate based on the transmission state; and
   for the non-media type file:
      setting the transmission state to a third value;
      commencing transmission of a first segment to the end user device at a rate based on the transmission state;
      the server autonomously monitoring the amount of data transmitted to the end user device;
      calculating a buffered amount of data existing at the end user device based on a lapsed time after commencing transmission and the amount of data transmitted;
      if the buffered amount of data increases above a third threshold value, setting the transmission state to a fourth value; and
      commencing transmission of a next segment to the end user device at a rate based on the transmission state.

10. The method of claim 9, wherein the second and fourth value indicates that no transmissions are to occur and the action of commencing transmission of the next segment at a rate based on the second or fourth value comprises not transmitting any data.

11. The method of claim 9, wherein the second and fourth value indicates that the rate is less than the rate for the first and third value and the action of commencing transmission of the next segment at a rate based on the transmission state set to the second or fourth value comprises transmitting the next segment at a lower transmission rate.

12. The method of claim 11, wherein if the buffered amount of data for the media type file declines below a second threshold or if the buffered amount of data for the non-media type file declines below a fourth threshold value, setting the transmission state to a fifth value and the action of commencing transmission of a next segment to the end user device at a rate based on the transmission state set to the fifth value comprises, selecting a transmission rate based at least in part on a value higher than the second value for the media type file and the fourth value for the non-media type file.

13. The method of claim 11, wherein the end user device is a mobile device.

14. A server for controlling a transfer of content between a content source and an end user device over a transmission channel, the server comprising:
   a memory element for storing data;
   a processor configured to autonomously:
      detect an establishment of a session between the content source and the end user device;
      detect a transmission of a content file from the content source to the end user device;
      identify a time required for rendering portions of the content file by the end user device;
      commence transmission of a portion of the content file to the end user device over a data path;
      monitor a time from the commencement of the transmission;
      calculate a buffered amount of data existing at the end user device based on the monitored time and the time required to render the transmitted data;
      detecting that the buffered amount of data at a first time period is equal or above a first threshold value and in response, retarding a delivery of more data, and
      detecting that the buffered amount of data at a second time period is below the first threshold value and above a second threshold value and accelerating the delivery of data and
      detecting that the buffered amount of data at a third time period is below the first threshold value and that there is available bandwidth for the data and in response accelerating the delivery of data.

15. The server of claim 14, wherein the processor is configured to retard the delivery of more data by stopping further data transmissions.

16. The server of claim 14, wherein the processor is configured to accelerate the delivery of data by resuming the transmission of data if the transmission was stopped, or continuing the transmission of data if the transmission was not stopped.

17. The server of claim 14, wherein the processor is configured to set a transmission state to one of at least two states, and the processing element is configured to accelerate the delivery of data if the buffered amount of data is below the second threshold and the transmission state is set to a no transmit state.

18. The server device of claim 14, wherein the processor is configured to set a transmission state to one of at least two states, and the processing element is configured to retard the delivery of data if the buffered amount of data is not below the first threshold and the transmission state is not set to a no transmit state.

* * * * *